United States Patent Office 3,271,821
Patented Sept. 13, 1966

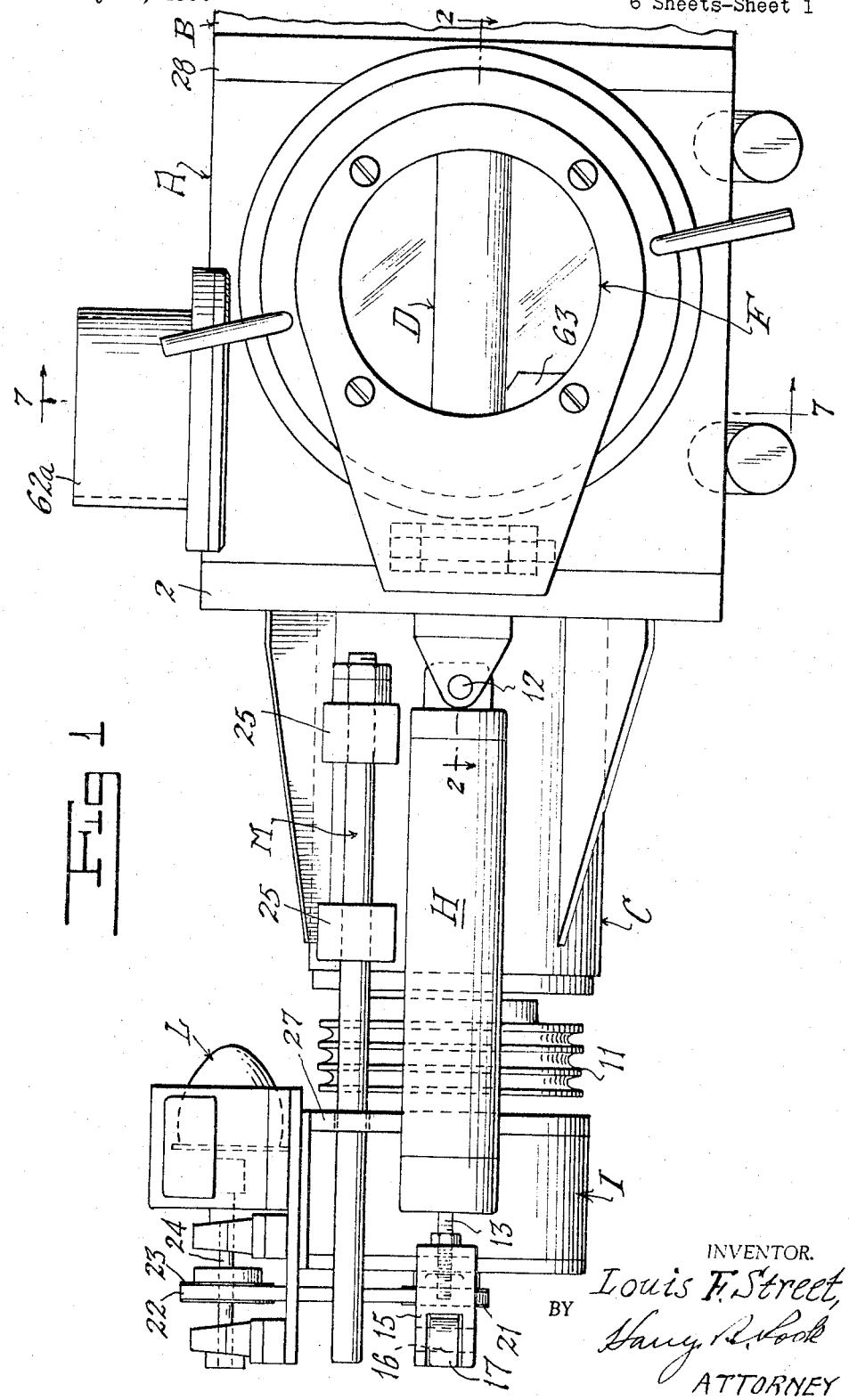

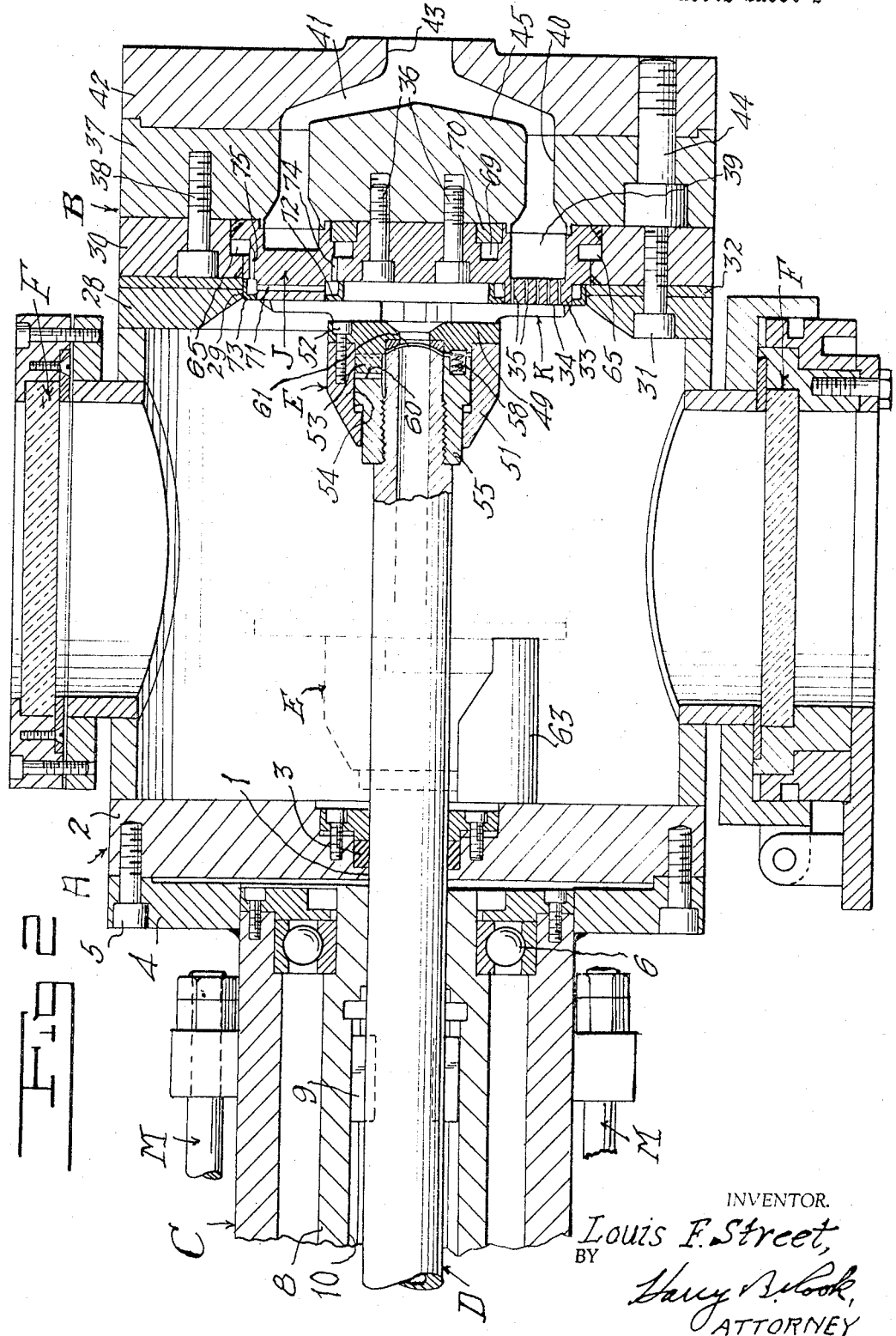

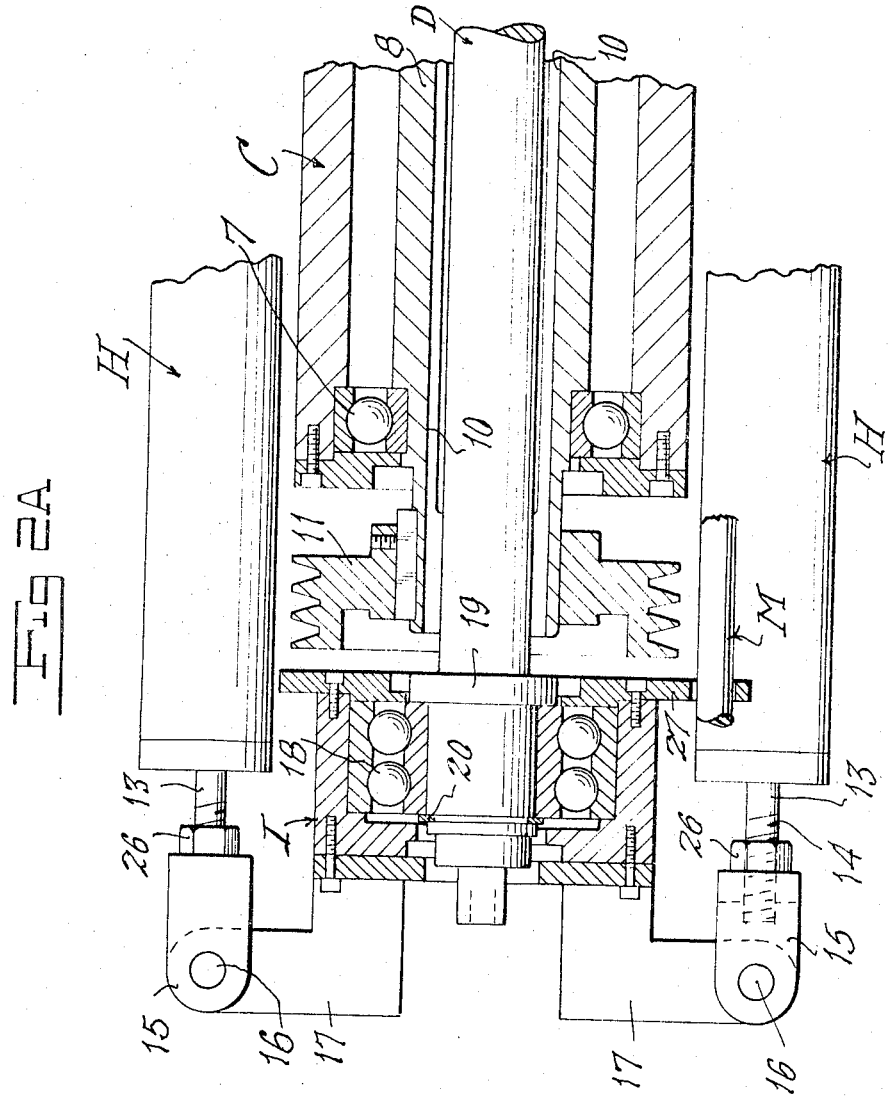

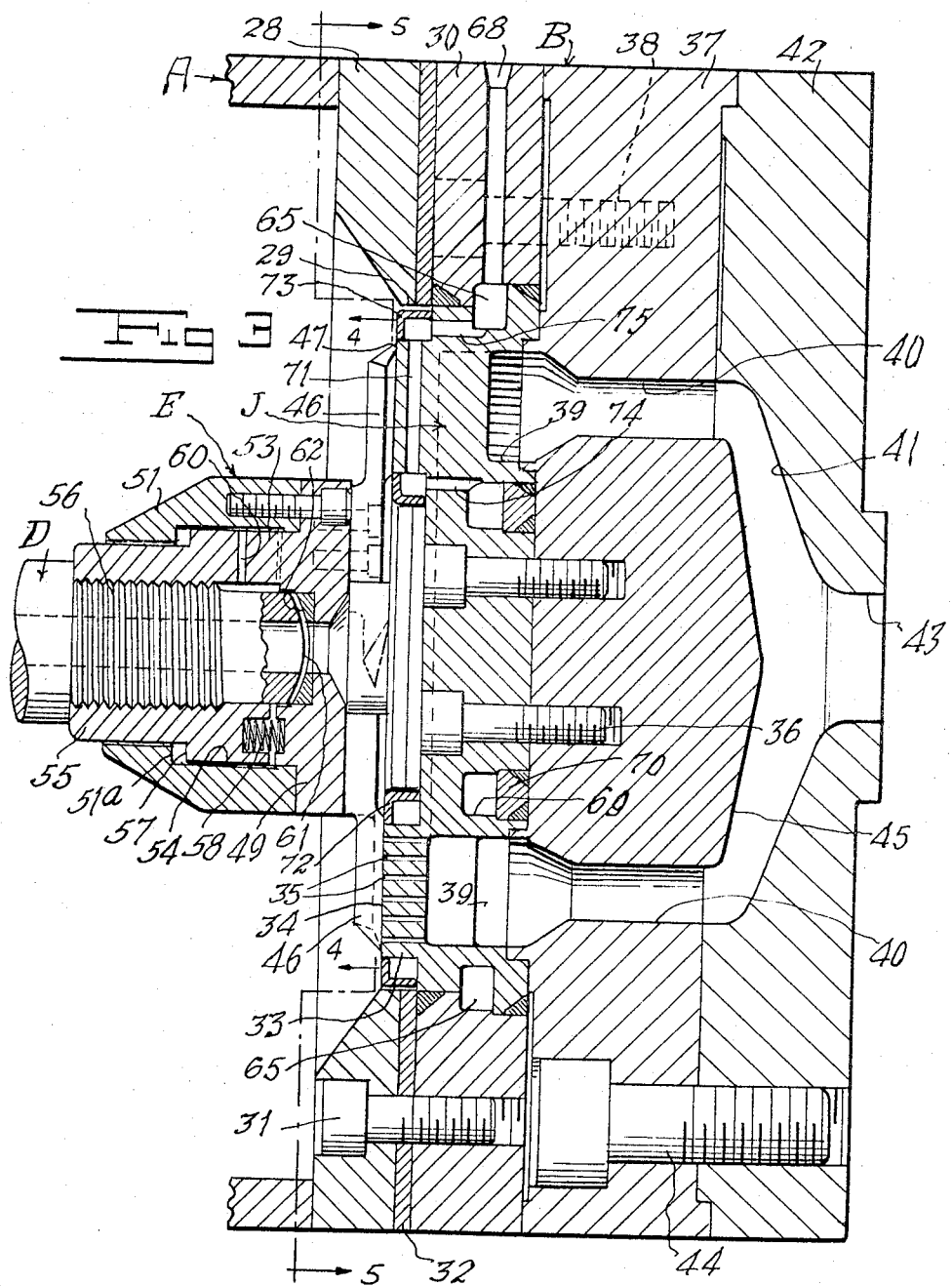

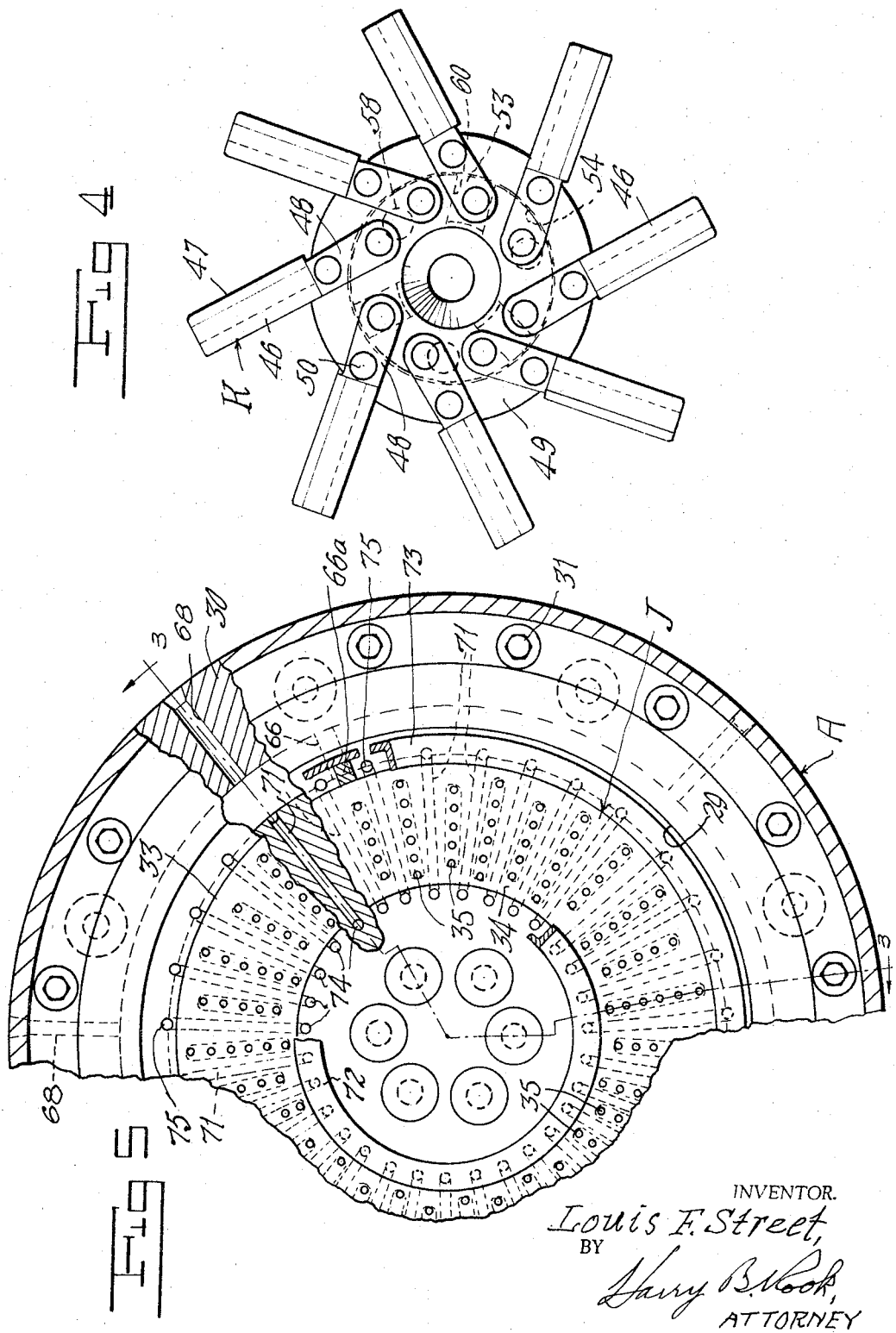

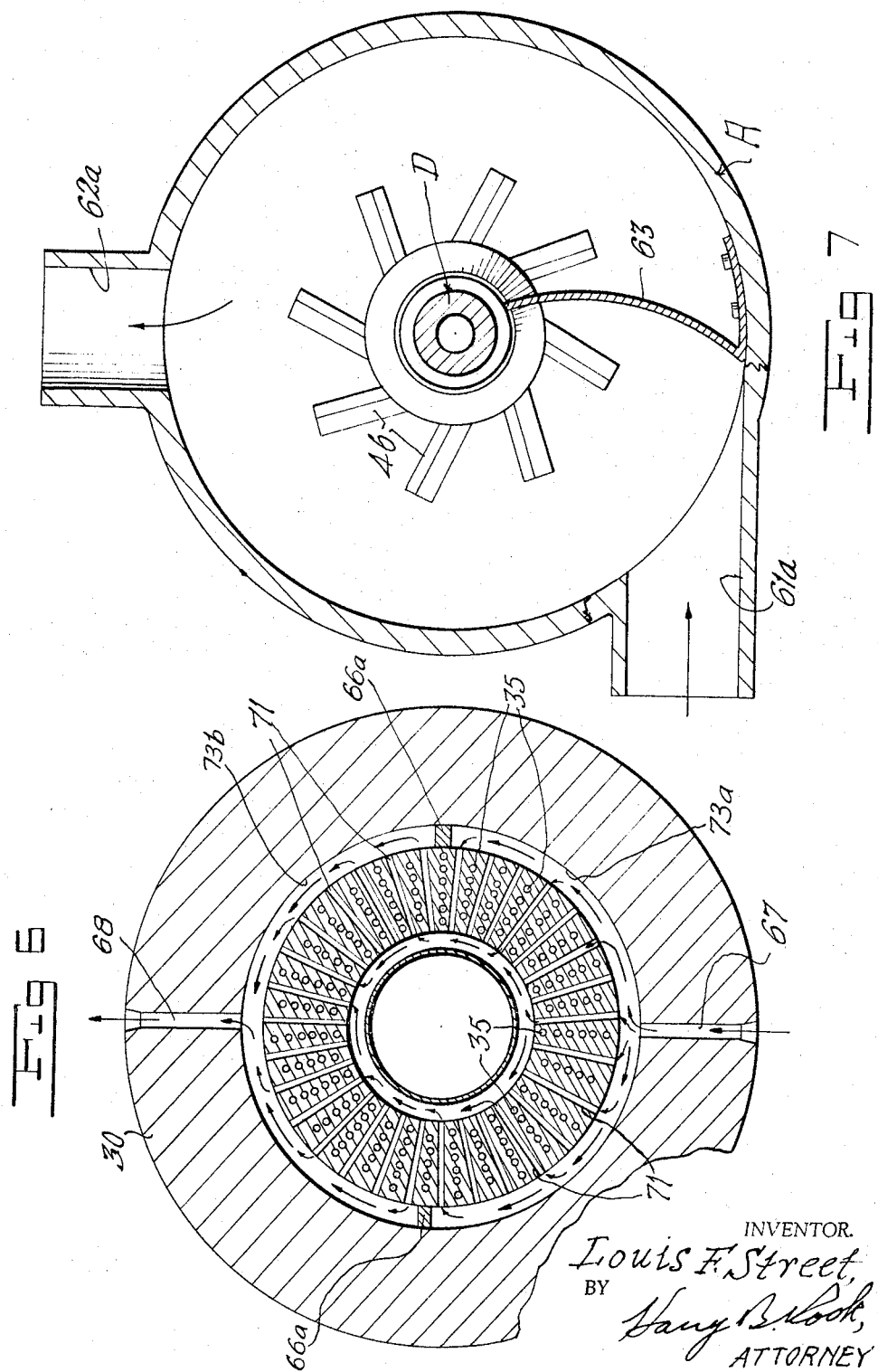

3,271,821
UNDERWATER PELLETIZER
Louis F. Street, Hampton, N.J., assignor to Frank W. Egan & Company, Somerville, N.J., a corporation of New Jersey
Filed July 24, 1964, Ser. No. 384,881
7 Claims. (Cl. 18—12)

This invention relates in general to a pellet forming apparatus of the type wherein hot thermoplastic material is extruded through a die plate in the form of hot thermoplastic rods which continuously emerge through extruding orifices from a flat face portion of a die plate into a chamber filled with water and are, while immersed in the water, cut into short lengths or pellets by revolving knives positioned on a cutter head which is mounted on and rotated by a shaft.

It is desirable that the cutting edges of the knives lie flat against the flat face of the die plate throughout their rotation, but in common practice, small angular misalignment of the cutting edges of the knives with the die face occurs with consequent vibration and non-uniform cutting of the plastic rods. This is caused by inevitable machining errors and the difficulty of maintaining the cutter shaft with its axis accurately perpendicular to the face of the die, and it occurs even when the knives are individually spring biased into contact with the face of the die plate. Therefore, one object of the invention is to provide a novel and improved construction and combination of a cutter head having knife blades rigidly mounted thereon, and means of the nature of a universal joint mounting the cutter head on the drive shaft to provide for tilting of the cutter head relatively to the shaft to produce automatic and constant alignment of the cutting edges of the knife blades in planes perfectly parallel with the face of the die, despite misalignment of the drive shaft or disposition thereof with its axis other than perfectly perpendicular to the die face.

Another object of the invention is to provide in such apparatus a novel and improved die plate having a circular flat face and extruding orifices extending therethrough in a plurality of rows radially disposed with respect to the axis of the drive shaft, and a die adapter block to which said plate is rigidly secured so that the die adapter block and die plate provide between them a channel for the thermoplastic material communicating with said orifices and the die adapter block firmly reenforces the die plate against the pressures incident to extrusion and the contact of the knife blades against the face of the die plate.

A further object is to provide in such apparatus novel and improved means for heating the die plate to prevent hardening of the thermoplastic material in the orifices, and thus to provide a novel construction and arrangement of conduits and passages for conducting a heating fluid in close proximity to said orifices and to the face of the die plate.

It is another object of the invention to provide novel and improved means for causing a circulation of the water in the chamber over the face of the die plate in a circular path and in the same direction as the rotation of the knives to quickly and efficiently carry the pellets away from the die face in a uniform manner and to conduct the pellets in a rotating helical path away from the die to a discharge opening at the opposite end of the chamber, including, in the case of pellets having a density less than that of water, a baffle to retard the rotation of the water and prevent the pellets from being forced toward and collect in large quantities at the center of the chamber adjacent the drive shaft.

Other objects, advantages and results of the invention will be brought out by the following description in conjunction with the accompanying drawings in which FIGURE 1 is a side elevation of an apparatus embodying the invention, with the die and die support broken away;

FIGURE 2 is an enlarged fragmentary horizontal sectional view approximately on the plane of the line 2—2 of FIGURE 1 showing the right hand end of the apparatus with the die and die support included, but with other parts omitted;

FIGURE 2a is a similar view illustrating the left hand end of the apparatus with portions broken away;

FIGURE 3 is a vertical longitudinal sectional view approximately on the plane of the line 3—3 of FIGURE 5;

FIGURE 4 is an elevational view of the cutter head and knives taken from the plane of the line 4—4 of FIGURE 3;

FIGURE 5 is a fragmentary view of the face of the die plate on the plane of the line 5—5 of FIGURE 3, on a slightly reduced scale, with portions broken away and shown in section;

FIGURE 6 is a schematic transverse sectional view through the apparatus in general similar to FIGURE 5, illustrating the paths of flow of the heating medium; and FIGURE 7 is a schematic transverse vertical sectional view approximately on the plane of the line 7—7 of FIGURE 1, with portions omitted.

Specifically describing the illustrated embodiment of the invention, the apparatus includes a main casing A that is shown substantially cylindrical and having secured thereto at one end thereof a die assembly B. At its other end the casing has secured thereto a bearing housing C for a drive shaft D one end of which extends into the casing and has mounted thereon a cutter head E on which are rigidly mounted knives K.

The casing is water tight and is shown as provided with two diametrically opposite sight openings and sight glass assemblies generally designated F through which the water and pellets in the casing can be easily observed during operation of the apparatus. The shaft D extends through an opening 1 in the end wall 2 of the casing and a seal 3 is secured in said opening around the shaft to prevent leakage of water out of the casing.

The bearing housing C has a flange 4 that is secured by suitable means such as cap screws 5 to the end wall 2 of the casing and has mounted therein two ball bearings 6 and 7 for a drive sleeve 8 through which the shaft D extends and to which the shaft is drivingly connected by suitable means such as keys 9 secured in the shaft and extending into longitudinal interior grooves 10 in the sleeve 8 so that the shaft may slide longitudinally of the sleeve while the driving connection of the sleeve with the shaft is maintained. The outer end of the driving sleeve is connected to a suitable source of power, for example by a V-belt pulley 11 that may be connected to a driving pulley in known manner.

The shaft D is longitudinally movable for the purpose of moving the cutter head into cutting position and for holding the knives on the cutter head in contact with the face of the die during cutting into pellets of the thermoplastic rods that are extruded through the die. For this purpose there is shown a pair of fluid pressure motors H of known construction preferably double-acting, each of which has one end pivotally connected at 12 to the end wall 2 of the casing at one side of the latter. The piston in each cylinder has a rod 13 which is threaded at 14 and screwed into a clevis 15 that is pivotally connected at 16 to a bracket 17 secured to auxiliary housing I in which is a ball bearing 18 that is connected to the outer end of the drive shaft D. The shaft has a collar 19 abutted by the bearing 18 so that when the motors H are energized to move their pistons to the right in the drawings, the shaft will be moved to the right and in turn move the cutter head E toward the die plate J. A retaining ring 20 between the other end of the bearing 18 and the shaft takes the thrust upon movement of the motor pistons in the opposite direction to draw the cutter head away from the die plate. The screw-threaded connections of the piston rods 14 with the clevis 15 permit initial adjustment of the cutter head to properly locate the knives in contact with the face of the die, the piston rods being rotated in the proper direction to adjust the shaft D toward or from the die plate as desired, and the piston rods being locked in the adjusted positions by jam nuts 26.

The housing I is supported by the shaft D and is shown as supporting a tachometer generally designated L that is driven by a pulley 21 connected to the outer end of the shaft D and over which runs a belt 22 that drives a pulley 23 on the shaft 24 of the tachometer. The auxiliary housing I has a front plate 27 and the housing is held against rotation by slidable contact of the plate 27 with two guide rods M one at each of two opposite edges of the plate 27 and mounted on the bearing housing C in lugs 25 projecting from the bearing housing.

The invention contemplates apparatus wherein the die plate has a flat face portion through which extend the extruding orifices, and the cutting edges of the knives normally lie flat against the face of the die plate and are rotated thereover by the drive shaft whose axis normally is perpendicular to the plane of the flat die face portion. An important feature of the invention is the provision of a cutter head having the knives rigidly mounted thereon and projecting from the periphery thereof, and the mounting of the cutter head on the shaft so that the cutter head may tilt relatively to the shaft axis to compensate for slight displacement of the shaft from its normal perpendicular relation to the plane of the die face and thereby maintain the cutting edges of the knives in proper contact with the die face.

As shown in the drawings the end wall 28 of the casing has an opening 29 therein coaxial with the shaft D, and the die plate J is rigidly connected to said end wall 28 with an annular portion 33 of the die plate extending through the opening 29. In the present instance the die plate is encircled by and welded to an annular ring 30 which is secured to the end wall 28 by cap screws 31 with suitable packing 32 between them, and the central portion of the die plate is secured as by cap screws 36 to a die adapter plate 37 which in turn is mounted on the ring 30 by cap screws 38, so that the adapter plate backs up and reenforces the die plate J. The annular portion 33 has a flat annular face portion 34 the plane of which is perpendicular to the normal axis of the drive shaft D as best shown in FIGURE 2, and through the annular portion of the die plate extend the extruding orifices 35 the inner ends of which communicate with an annular channel 39 in the rear side of the die plate which in turn communicates with a circular row of spaced passages 40 in the die adapter plate 37 to which thermoplastic material is fed under pressure from a suitable source through a circular dish-like recess 41 in an inlet plate 42 that has a central inlet opening 43 to which is connected the outlet of an extruder or press that supplies the thermoplastic material. The inlet plate 42 is shown as connected to the adapter plate 37 by cap screws 44.

The circular row of passages 40 leaves a solid and rigid central portion 45 in the die adapter plate to resist pressure of the thermoplastic material that is forced into the inlet opening 43 and to provide a firm support for the die plate J. The annular channel 39 in the die plate distributes the thermoplastic material so that it flows uniformly through all of the extruding orifices 35.

Preferably the extruding orifices are arranged in a plurality of rows extending radially with respect to an extension of the axial line of the drive shaft, the rows of the orifices being closely and equidistantly spaced apart and the orifices in each row are spaced apart equidistantly as best shown in FIGURE 5. The orifices in alternate rows are spaced different radial distances from the center of the die so that the orifices in each row are in staggered relation to the orifices of the next adjacent rows; and the cutting edges of the knives K are longer than the longest row of orifices so that when each knife rotates about the center of the die, substantially all portions of the cutting edge along its length will contact the thermoplastic material and will produce a plurality of pellets as the knife moves across each row of orifices.

As hereinbefore indicated, the invention contemplates the formation and mounting of the knife blades K so that their cutting edges flatly contact the flat die face portion throughout their lengths, and the invention provides means for maintaining the cutting edges in that desired contact with the die face during the pelletizing operation. As shown, each blade K has a body portion 46 at one edge of which is the cutting edge 47 and at one end of which is a shank 48 which is rigidly connected to the head plate 49 of the cutter head E by screws 50. The cutting edge 47 of each blade is V-shaped in the cross-section and the body portion of the blade is relieved behind the cutting edge so that only the cutting edge will contact the die face. The blades project from the periphery of the circular head plate 49 as best shown in FIGURES 3 and 4 and are inclined in the direction opposite that of the rotation of the cutter head so that the pellets are pushed away from the cutter head as they are severed from the thermoplastic rods that are continuously extruded through the orifices 35. The head plate 49 is rigidly connected to the body portion 51 by suitable means such as cap screws 52 and is shown as having a plurality of equidistantly spaced lugs 53 extending into a cylindrical recess 54 in the body portion 51. The body portion 51 is loosely mounted on a head adapter 55 which is rigidly secured on the inner end of the drive shaft as by screw threads 56. The bottom or inner end of the cylindrical recess 54 in the body portion 51 has a shoulder 51a that abuts a shoulder 57 on the head adapter to limit movement of the body portion longitudinally of the shaft in the direction of the inner end of the shaft that is normally disposed in proximity to the die plate, and the body portion and head plate 49 are normally yieldingly influenced in that direction by a plurality of compression springs 58 that are interposed between the head adapter 55 and the head plate 49 and are equidistantly circumferentially spaced around the shaft as best shown in FIGURES 3 and 4. The end of the head adapter has a plurality of notches 60 in each of which is disposed one of the lugs 53 of the head plate so that the head is driven through said lugs by the drive shaft D normally concentrically with the shaft. The loose mounting or clearance between the body portion 51 of the cutter head and the head adapter on the shaft, including the lugs 53 in the notches 60, best illustrated in FIGURE 3, permits the cutter head to tilt relatively to the axis of the shaft in the nature of a universal joint, so that when conditions require it the knives can remain in proper contact with the die face in other than perpendicular relation to the shaft axis. Preferably and as shown, the end surface of the shaft is segmentally spherically convexly curved as indicated at 61 and the head plate has a correspondingly curved concave seat 62 to facilitate the universal movement of the cutter head on the shaft.

With this construction, it will be observed, that when the apparatus is at rest and the knives are withdrawn from contact with the die face, the springs 58 bias the cutter head outwardly of the end of the shaft until the shoulder 51a abuts the shoulder 57. When it is desired to start operation of the machine, the fluid pressure motors H are energized in the normal manner to actuate the drive shaft D longitudinally and move the knives into contact with the die face, the springs 58 yielding so as to hold the knives in yielding frictional contact with the die face.

The forward position of the head adapter 55 will be adjusted by adjustment of the piston rods of the motors as above described. For example, assuming that the total motion of the shaft and cutter head is three-eighths of an inch in an axial direction, the shaft might be moved to bring the head into contact with the die plate and then moved about one-quarter of an inch farther, thus leaving about one-eighth of an inch of possible movement of the cutter head relative to the shaft to permit tilting of the head and freedom of self-positioning of the head and the knives carried thereby. During the operation of the machine, the shaft will be rotated from a suitable source of power through the pulley 11, and the thermoplastic material will be continuously extruded as thin rods through the extruding orifices 35 so that the knives during their rotation sever pellet-size portions from all of the extruded rods.

During the pelletizing operation, the casing is filled with water some of which may enter through hollow drive shaft D that has a water supply connected to its outer end, the major portion of the water entering through inlet 61a beneath the die face at the bottom of the casing, as best shown in schematic FIGURE 7. The water leaves the upper portion of the casing with the suspended pellets therein through an outlet opening 62a. The water is forced into the casing under pressure tangentially through the inlet 61a as best shown in FIGURE 7 and in the same direction as the rotation of the cutter head so that the pellets are quickly carried away from the die face and cutter head and through the casing toward the end thereof opposite the die with a somewhat helical motion. To impede the rotation of the water and prevent the pellets from being drawn toward the center of the casing and the shaft D by centripetal force, a baffle 63 is secured in the casing adjacent the end of the casing opposite the die plate.

The apparatus also includes means for maintaining the proper temperature in the die plate during the continuous cutting operation when the face of the die plate is exposed to water. The water, of course, tends to cool the die plate which tends to "freeze off" the orifice holes by hardening of the molten thermoplastic material in the orifices. It is essential to satisfactory operation that the thermoplastic material be kept in free flowing condition through the orifices but that the pellets be quickly cooled by the water so that the pellets will be properly formed and prevented from sticking together.

According to the invention, the temperature of the die plate is controlled by a fluid medium such as steam or hot water under high pressure, or hot oil, or equivalent medium, circulating through passages in the die. FIGURES 3 and 5 show the passages and FIGURE 6 shows schematically the paths of circulation of the heating medium. The annular ring 30 provides between its interior periphery and the outer periphery of the die plate, an annular channel 65 concentric with the die face and disposed adjacent the outer ends of the rows of orifices, and the channel is divided into lower and upper semicircular manifold portions 65a and 65b respectively, by blocks 66 best shown in FIGURE 6. The annular ring 66 has at least one inlet passage 67 to permit the flow of the heating medium into the lower manifold portion of the channel, and at least one outlet passage 68 to permit the flow of the heating medium out of the upper manifold portion. Adjacent the inner ends of the rows of orifices the die plate has a circular channel 69 that is shown as formed by a groove in the rear surface of the die plate closed at one side by a packing ring 70. Between each two adjacent rows of orifices and close and parallel to the face of the die is a passage 71 opposite ends of which open through the inner and outer peripheries of the annular portion 33, respectively; and secured to the die plate at said inner and outer peripheries of the annular portion are rings 72 and 73 respectively that provide circular channels which communicate with the channels 69 and 65, respectively, by respective transverse passages 74 and 75.

Circular channel 73 is divided into lower and upper semi-circular portions 73a and 73b respectively by blocks 66a, such that blocks 66 and 66a are located between the same pairs of transverse passages 75, as best shown in FIGURE 5.

The flow of the heating medium is best understood by reference to schematic drawing FIGURE 6, wherein inner circular channels 69 and 72 are shown as one channel with connecting transverse passages 74 omitted and in a like manner, outer circular channels 65 and 73 are shown as one channel with connecting transverse passages 75 omitted for clarity. The heating medium is supplied from a suitable source and enters the lower manifold portions 65a and 73a of channels 65 and 73 and passes therefrom through certain of the passages 71 into the upper manifold portions 65b and 73b of channels 65 and 73 from which the medium flows through the outlet passage 68, as indicated by the arrows. Thus, the heating medium enters the die plate through inlet passage 67 into the lower manifold 65a, flows through certain of the transverse passages 75 into lower manifold 73a, thence inwardly through the passages 71 in close proximity to the orifices and to the face of the die, into inner circular channel 72, thence outwardly through passages 71 in the upper portion of the die plate, close to the orifices and to the die face, into the upper manifold 73b, then flows through upper transverse passages 75 into the upper manifold 65b, and thence outwardly through the outlet passage 68.

If steam should be used as the heating medium, any condensate would be discarded through the lower portion of the die plate.

With this construction, the surface of every orifice is heated in the same manner and substantially uniformly from both sides thus giving an efficient and uniform temperature control to the surfaces of all of the orifices. Also the heat is supplied at the face of the die plate near the outer extremeties of the orifices so as to greatly reduce the possibility of "freezing off" or hardening of the thermoplastic material at the face of the die plate due to the presence of the cold water in contact with the face of the plate. This is advantageous in that it permits the apparatus to run at low rates and thus more reliably, inasmuch as the heating of the walls of the orifices makes it possible to operate with the thermoplastic material at a lower temperature and flowing at lower rates than has been required in the prior art apparatus utilizing other methods of heating. The construction is also advantageous during starting of the apparatus, especially where it is desirable to have the rotating knives in contact with the die face and to have the cold water circulating across the die face prior to the extrusion of the thermoplastic material through the orifices. The well heated die reduces the possibility of hardening of the thermoplastic material in the orifices at the die face when the flow of said material is started.

While I have shown the invention as embodied in the now preferred construction, it will be understood by those skilled in the art that this is primarily for explaining the principles of the invention and that modifications or changes in the structural details of the apparatus may be made within the spirit and scope of the invention.

I claim:

1. Apparatus for pelletizing thermoplastic materials comprising a housing, an extrusion die in said housing having a flat face through which extends a plurality of extruding orifices, a drive shaft journaled in said housing with its axis of rotation perpendicular to the face of said die, a cutter head adapter on said shaft and a cutter head having a universal connection to the end of said cutter head adapter rotatable therewith and tiltable thereon and movable relative to said cutter head adapter longitudinally thereof, a plurality of cutting blades mounted on said cutter head and extending outwardly beyond the periphery thereof and adapted to slide over and in contact with said face of the die upon rotation of said drive shaft to cut material extruded from said orifices, yielding means pressing said cutter head toward said die to maintain constantly yielding contact of the blades with said die face, and means limiting movement of said cutter head toward the die face comprising a shoulder on said cutter head and a shoulder on said cutter head adapter, both of said shoulders being disposed at the side of said universal connection opposite said die face, said shoulders abutting each other under the influence of said yielding means upon movement of the cutter blades out of contact with the die face and being held in spaced apart relation to each other so long as said cutter blades are held in contact with said die face by said yielding means.

2. Apparatus for pelletizing thermo-plastic materials as defined in claim 1, wherein said yielding means includes springs circumferentially spaced apart and interposed between said cutter head and said cutter head adaptor, and means for moving said shaft longitudinally toward said die.

3. Apparatus for pelletizing thermo-plastic materials as defined in claim 1, wherein said yielding means includes springs circumferentially spaced apart and interposed between said cutter head and said cutter head adaptor, and means for moving said shaft longitudinally toward said die and said universal connection includes a spherically convex surface on one of the drive shaft and said cutter head coactive with a concave surface on the other of said shaft and said cutter head, and loosely intermeshing coacting lugs and grooves on said cutter head adaptor and said cuter head providing for rotation of the cutter head with the shaft and for tilting of cutter head relatively to the shaft.

4. Apparatus for pelletizing thermoplastic materials comprising a housing, a circular die plate having a flat face and a plurality of extruding orifices extending through said face, a drive shaft journaled in said housing with its axis perpendicular to said die face, a cutter head mounted on said shaft and having a plurality of cutting blades extending from the periphery thereof for slidable contact with said die face upon rotation of said drive shaft, said orifices being arranged in a plurality of rows radially disposed with respect to an extension of the axial line of said drive shaft and said rows being arranged in a circular series coaxial with said shaft, a die adaptor plate rigidly mounted on said housing in rigid contact with the rear side of said die plate, said die plate and said die adaptor plate providing between them an annular recess concentric in the said circular series of rows or orifices with which communicates all of said orifices, and there being fastening means securing said die plate to said die adaptor plate inside the inner periphery and outside the outer periphery of said recess, respectively, said die adaptor plate having means for connecting said annular recess to a source of extruded thermoplastic material, wherein said die plate has a plurality of passages for heating fluid, each between two of said rows of orifices, an inlet manifold duct for a heating fluid connected to the outer ends of certain of said passages, an outlet manifold duct connected to the outer ends of others of said passages and a transfer duct connected in common to the inner ends of all of said passages.

5. Apparatus for pelletizing thermo-plastic material as defined in claim 4 wherein a ring encircles said die plate in fluid tight relation thereto and is secured to said die adaptor plate, and said inlet duct and outlet duct are formed by complemental grooves in the peripheral surfaces of said die plate and said ring.

6. Apparatus for pelletizing thermo-plastic materials comprising a horizontal cylindrical housing, an extrusion die in one end of said housing having a flat face through which extends extruding orifices, a drive shaft journaled in said housing with its axis perpendicular to said die face, a cutter head on said shaft having a plurality of cutting blades secured thereon to slidably contact said die face upon rotation of the shaft and cut into pellets material extruded through said orifices, means for rotating said shaft and cutter head in one direction, means for introducing water into said cylindrical housing tangentially to the inner periphery thereof and in the same direction as the rotation of said cutter head to move the pellets in a helical path away from said die, and means including an outlet for conducting the water carrying said pellets out of said housing.

7. Apparatus as defined in claim 6 wherein the last-named means includes a baffle between said inlet and said outlet for diverting the water and pellets out of said helical path to said outlet.

References Cited by the Examiner

UNITED STATES PATENTS

| 2,918,701 | 12/1959 | Hull et al. | 18—1 XR |
| 3,114,169 | 12/1963 | Palmer et al. | 18—12 |
| 3,196,487 | 7/1965 | Snelling | 18—12 |

FOREIGN PATENTS

| 504,933 | 12/1954 | Italy. |

WILLIAM J. STEPHENSON, *Primary Examiner.*